Nov. 1, 1938.　　　　M. LANDAU　　　　2,135,009
PROCESS OF SEPARATING HYDROCARBON MIXTURES INTO FRACTIONS
Filed Aug. 10, 1935
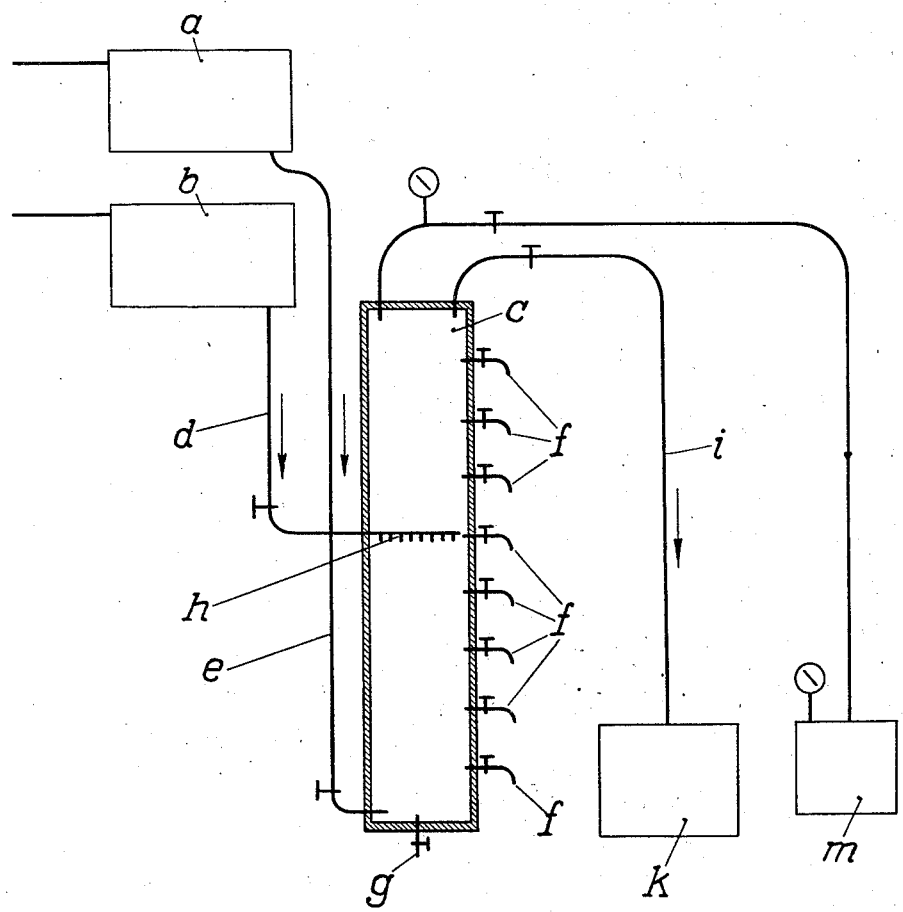
Inventor:
MAX LANDAU
Attorneys.

Patented Nov. 1, 1938

2,135,009

UNITED STATES PATENT OFFICE 2,135,009

PROCESS OF SEPARATING HYDROCARBON MIXTURES INTO FRACTIONS

Max Landau, Berlin-Wilmersdorf, Germany, assignor to N. V. Machinerieen-en Apparaten Fabrieken "Meaf", Utrecht, Netherlands Application August 10, 1935, Serial No. 35,650
In Germany August 7, 1934

4 Claims. (Cl. 196—13)

This invention relates to a process of separating hydrocarbon mixtures into several fractions.

To resolve mixtures of hydrocarbons like mineral oils into the different fractions it has been the usual practice hitherto to subject them to distillation and fractional condensation to obtain products like benzine, petroleum, gas oil, lubricating oils, and asphalts from the crude oils.

According to the invention, the resolution of hydrocarbon mixtures into several fractions can be attained by treating the mixtures with an extraction agent which dissolves the various fractions out of the crude mixture and which can be separated from the extracts by distillation.

It has been found that if a sufficient quantity of a suitable extraction agent is suitably brought together with the crude oil mixture the dissolving process proceeds so that for instance in a liquid column of the extraction agent the various fractions dissolve in different levels of this column. If provisions are made for removing the extraction agent and the oil fraction dissolved therein at different levels of this column and if the extraction agent is then distilled off, the different fractions of the mineral oil will be obtained. This result is caused by the fact that the solubility of the different fractions in the extraction agent is not the same. The extraction agent first dissolves the fraction of the oil having the lowest specific gravity. The fraction having thus passed into solution remains in the extraction agent while the next fraction, which is not dissolved as yet, settles down within the liquid extraction column because of its higher specific gravity. In this way, the portions of the mineral oil having low specific gravity will be found at the top of the liquid extraction column and the portions of greater specific gravity in the lower part thereof. Those portions of the mineral oil which cannot be dissolved in the extraction agent collect below the column of the extraction agent.

This process requires that the extraction agent have a lower specific gravity than the oil mixture to be treated and each fraction thereof and, furthermore, that it possess good dissolving power with respect to the hydrocarbons present in the mixture.

For example, if a crude oil having a specific gravity of 0.937 at 20° C. is treated with benzine having a specific gravity of only 0.7338 at 20° C., the mineral oil of greater specific gravity will settle in the benzine column and during its passage deliver its constituents to the benzine by means of solution. The substances of the mineral oil having the lowest specific gravity will of course be dissolved out in the top layer of the benzine used for extraction and those of greater specific gravity in the medium and lower layers, the insoluble constituents being finally collected below the column of benzine.

The process is preferably carried out as follows:

The extraction agent, benzine, and the mineral oil are filled into the elevated tanks $a$ and $b$ by means of pumps. The tanks $a$ and $b$ are connected with a high column $c$ by pipings, the connecting piping $e$ of the benzine tank $a$ opening into the lowermost portion of the column $c$ and the connecting piping $d$ of the oil tank $b$ approximately into the center of the column. Over the entire height of the column $c$ draw-off taps or cocks $f$ are distributed to permit the removal of liquid from the column at any height. The bottom of column $c$ is further provided with an outlet $g$ for eliminating the undissolved constituents of the mineral oil which have collected below the benzine column from the column $c$. To insure greatest possible uniformity in the distribution of the mineral oil in the benzine column the connecting pipe $d$ opens within the extraction column into the cross pipe system $h$ provided with downwardly directed outlet openings.

The apparatus functions as follows:

The column $c$ is filled with benzine from the elevated tank $a$ up to directly below the member $h$, the filling being done automatically by the constant hydrostatic pressure of the tank. The supply of benzine is then shut off and the oil inlet opened, whereupon oil from the elevated tank $b$ will automatically flow under hydrostatic pressure through the member $h$ into the column $c$, the oil portions of greater specific gravity flowing through the extraction column and delivering its constituents thereto during its passage by dissolution.

Example

The lower part of the column $c$ is filled with 12 500 kg. benzine from the elevated tank $a$, whereupon the benzine supply is shut off and the oil inlet opened. From the elevated tank $b$ 12 227 kg. oil automatically flow through the member $h$ into the column $c$ which is fitted with a cooling jacket for keeping the benzine column at 15° to 20° C. while the inflowing oil is heated by steam coil in the tank up to about 60° to 70° C. When the column $c$ is filled up to its cover, the supply of oil is shut off, and the contents of the column are left therein for about 6 hours without any interference. During the next six hours the column is subjected to a pressure of approximately 3 atmospheres by the oil pressure vessel *m*, whereupon the overflow pipe *i* in the cover of the column is opened and enough liquid will flow out of the column into a receiver *k* to effect equalization of pressure with the outer air. Finally, 2.015 kg. benzine are admitted from the tank *a* to the column *c*, and the same amount of liquid passes from the overflow pipe *i* to the receiver *k*. The benzine piping is then shut off and the liquid in the column left therein for about 6 hours at atmospheric pressure.

After this period, liquid is taken from the column *c* at different heights through the draw-off cocks *f*, the first extract removed being the content of the column down to and including the third cock from above, followed by the second extract down to and including the sixth cock and the third extract down to and including the eighth cock. Constituents of the mineral oil that have not passed into solution are taken from the column through the bottom valve. The various extracts are then freed from benzine by distillation.

The first extract has a specific gravity of 0.9384; the second extract has a specific gravity of 0.9412; the third extract has a specific gravity of 0.9510; and the part undissolved by benzine and discharged through the bottom valve has a specific gravity of 0.9630.

The three extracts are then refined by sulfuric acid, neutralized by lime and bleached by fuller's earth, and the three refined products show the following specific gravities:

Refined first extract _____ 0.9205
Refined second extract _____ 0.9216
Refined third extract _____ 0.9290

In view of their other properties, these three refined products are machine or motor oils.

I claim:—

1. In a process for the separation of hydrocarbon mixtures of the type of mineral oils into several fractions the steps consisting in charging a column up to substantially one-half of its height with an extraction agent having a lower specific gravity than the hydrocarbon mixture to be treated and each fraction thereof and which extraction agent is capable of dissolving the greater portion of said hydrocarbon mixture, causing the hydrocarbon mixture to flow into the extraction column in a uniformly distributed manner until the column is filled, allowing the contents of the column to stand until separation is completed, withdrawing the different fractions together with the extraction agent from different levels of the column of the extraction agent which contains dissolved therein various fractions of the hydrocarbon mixture, and removing the extraction agent from the different fractions.

2. In a process for the separation of hydrocarbon mixtures of the type of mineral oils into several fractions the steps consisting in charging a column up to substantially one-half of its height with an extraction agent having a lower specific gravity than the hydrocarbon mixture to be treated and each fraction thereof and which extraction agent is capable of dissolving the greater portion of said hydrocarbon mixture, causing the hydrocarbon mixture to flow into the extraction column in a uniformly distributed manner until the column is filled, temporarily subjecting the contents of the column to superatmospheric pressure, allowing the column to stand until separation is completed, withdrawing the different fractions together with the extraction agent from different levels of the column of the extraction agent which contains dissolved therein various fractions of the hydrocarbon mixture, and removing the extraction agent from the different fractions.

3. In a process for the separation of hydrocarbon mixture of the type of mineral oils into several fractions the steps consisting in charging a column up to substantially one-half of its height with an extraction agent having a lower specific gravity than the hydrocarbon mixture to be treated and each fraction thereof and which extraction agent is capable of dissolving the greater portion of said hydrocarbon mixture, and causing the hydrocarbon mixture to flow into the extraction column in a uniformly distributed manner by allowing the extraction agent and the hydrocarbon mixture to flow from elevated tanks to the extraction column while maintaining a constant hydrostatic pressure until the column is filled, then allowing the contents of the column to stand until separation is completed, withdrawing the different fractions together with the extraction agent from different levels of the column of the extraction agent which contains dissolved therein various fractions of the hydrocarbon mixture, and removing the extraction agent from the different fractions.

4. In a process for the separation of hydrocarbon mixtures of the type of mineral oils into several fractions, the steps consisting in charging a column to substantially one-half its height with an extraction agent of light hydrocarbon nature having a lower specific gravity than the hydrocarbon mixture to be treated and each fraction thereof and which extraction agent is capable of dissolving the greater portion of said hydrocarbon mixture, causing the hydrocarbon mixture to flow upon the column of extraction agent in a uniformly distributed manner until the column is filled, allowing the contents of the column to stand until separation is completed, withdrawing the different fractions together with the extraction agent from different levels of the column of the extraction agent which contains dissolved therein various fractions of the hydrocarbon mixture and removing the extraction agent from the different fractions.

MAX LANDAU.